United States Patent [19]

Smith, deceased

[11] Patent Number: 4,825,028
[45] Date of Patent: Apr. 25, 1989

[54] MAGNETRON WITH MICROPROCESSOR POWER CONTROL

[75] Inventor: Peter H. Smith, deceased, late of Anchorage, Ky., by Pamela Sheila Smith, executor

[73] Assignee: General Electric Company, Louisville, Ky.

[21] Appl. No.: 138,137

[22] Filed: Dec. 28, 1987

[51] Int. Cl.$^4$ .............................................. H05B 6/64
[52] U.S. Cl. ............................. 219/10.55 B; 363/98; 363/132
[58] Field of Search ............... 363/17, 98, 132; 219/10.55 B

[56] References Cited

U.S. PATENT DOCUMENTS

| | | | |
|---|---|---|---|
| 3,735,237 | 5/1973 | Derby | 363/8 |
| 3,842,233 | 10/1974 | Lamb | 219/10.55 B |
| 4,071,812 | 1/1978 | Walker | 363/80 |
| 4,194,160 | 3/1980 | Loucks | 219/10.55 B |
| 4,250,544 | 2/1981 | Alley | 364/110 |
| 4,281,372 | 7/1981 | Kornrumpf | 363/20 |
| 4,318,165 | 3/1982 | Kornrumpf et al. | 363/21 |
| 4,375,587 | 3/1983 | Perl | 219/10.55 B |
| 4,420,668 | 12/1983 | Larson et al. | 219/10.55 B |
| 4,420,669 | 12/1983 | Scalf et al. | 219/10.55 B |
| 4,454,573 | 6/1984 | Petsch et al. | 363/98 |
| 4,520,437 | 5/1985 | Boetteher et al. | 363/98 |
| 4,587,605 | 5/1986 | Kovyama et al. | 363/98 |
| 4,593,167 | 6/1986 | Nilssen | 219/10.55 B |
| 4,635,177 | 1/1987 | Shekhawat et al. | 363/132 |
| 4,672,159 | 6/1987 | Nilssen | 219/10.55 B |
| 4,680,506 | 7/1987 | Nilssen | 315/102 |
| 4,695,933 | 9/1987 | Ngvyen et al. | 363/17 |
| 4,742,442 | 5/1988 | Nilssen | 363/98 |

*Primary Examiner*—Patrick R. Salce
*Assistant Examiner*—Jeffrey Starrett
*Attorney, Agent, or Firm*—H. Neil Houser; Radford M. Reams

[57] ABSTRACT

A microwave oven uses a full wave full bridge inverter for supplying energy to a cooking magnetron by way of a power transformer. The inverter is controlled by a microprocessor which acts upon a control circuit having an oscillator. The control circuit provides gating pulses which are used to switch on FET switches in the inverter. The microprocessor stops and starts the gating pulses. The microprocessor may adjust the power of magnetron by turning the control circuit on and off for variable time intervals. Alternately, the microprocessor may control the power of the magnetron by changing the switching frequency of the inverter. The microprocessor is used in a filament standby mode to monitor the current in the magnetron's filament. In the filament standby mode, the inverter is operated at a lower than normal voltage such that the magnetron is not generating microwave power, but its filament is receiving sufficient current to warm it up, the current flowing through a filament winding of a power transformer. A primary winding of the power transformer is connected to the inverter.

27 Claims, 10 Drawing Sheets

MAGNETRON WITH MICROPROCESSOR POWER CONTROL

CROSS-REFERENCE TO RELATED APPLICATIONS

This application discloses and claims subject matter related to subject matter disclosed and claimed in the following related applications, which applications are filed concurrently herewith and are hereby incorporated by reference:

"MAGNETRON WITH FULL WAVE BRIDGE INVERTER", Ser. No. 138,138;
"FILAMENT POWER COMPENSATION FOR MAGNETRON", Ser. No. 138,136;
"MAGNETRON WITH MICROPROCESSOR BASED FEEDBACK CONTROL", Ser. No. 138,139;
"MAGNETRON WITH TEMPERATURE PROBE ISOLATION", Ser. No. 138,714; and
"MAGNETRON WITH FREQUENCY CONTROL FOR POWER REGULATION", Ser. No. 138,135.

These applications, which were filed under the name of Peter Smith except that the application "MAGNETRON WITH FREQUENCY CONTROL FOR POWER REGULATION" was filed in the name of the present inventor and Flavian Reising, Jr. as co-inventor and "FILAMENT POWER COMPENSATION FOR MAGNETRON" names the present inventor, Flavian Reising, Jr. and Thomas R. Payne as co-inventors, are assigned to the assignee of the present application.

BACKGROUND OF THE INVENTION

This invention relates generally to a cooking magnetron system and, more particularly, to such a system using a full wave full bridge inverter controlled by a microprocessor.

Today commercially available domestic microwave ovens commonly employ microprocessor based electronic controls. Such controls typically include an entry keyboard, and a display device, each operatively connected to a microprocessor. The microprocessor contains memory which sequences the correct operation of the microwave oven following a command or request entered by the user via the keyboard. Typically, the electronic controls may display the time of day, cooking mode, cooking time selected, cooking time remaining, selection of special cooking algorithms, power level selected, food temperature selected, and food temperature measured. The microprocessor receives data from the keyboard, monitors door closure, and receives temperature data from a temperature probe or meat thermometer. Additionally, the microprocessor may control the power level by duty cycle switching of a power transformer as used in a 50 or 60 Hz LC power supply system. The electronic controls including the microprocessor may also function to turn on a cooling fan, cavity illumination lamp, and generate an audible warning or alarm.

Although the microprocessor based microwave oven control systems have been generally useful, the microcomputer controls commonly used for appliances have not been suitable for some types of power supplies. For example, typical microcomputer or microprocessor appliance control arrangements do not provide sufficiently fast control for controlling a high frequency switching inverter, such as disclosed in the hereinbefore referenced U.S. patent application Ser. No. 138,138 which operates at a switching frequency on the order of 20-30 KHz. Commonly used low cost appliance type controllers such as Texas Instruments TMS 2XXX series of 4 bit microcomputers or the generally similar Hitachi type HMCS 43 or HMCS44A, do not generate voltage logic pulses at a sufficiently high rate to use the microcomputer output for controlling the inverter frequency. Such controllers may take longer to fetch a single instruction and to cause the transfer of data than the maximum pulse width required if the inverter were to be directly driven. Limitations, such as timing considerations, therefore, pose significant problems for microprocessor control of some microwave arrangements.

SUMMARY OF THE INVENTION

Accordingly, it is a primary object of the present invention to provide a new and improved microwave energy generating system wherein a microprocessor is used to control an inverter which supplies power to a cooking magnetron.

A more specific object of the present invention is to provide a microwave energy generating system wherein a microprocessor is used to adjust the operation of an inverter which, in turn, establishes the power output of a cooking magnetron.

The above and other objects of the present invention which will become more apparent as the description proceeds are realized by a microwave energy generating system having a magnetron to generate microwave energy for cooking, a power transformer having a primary and a magnetron powering secondary, and an inverter connected to supply power to the primary for selectively switching a plurality of controlled switches. The inverter is preferably a full wave full bridge inverter having four controlled switches which are switched in pairs. A control circuit including an oscillator controls the operation of the inverter by generating gating pulses to switch the controlled switches. A microprocessor has a first output port connected to the control circuit and operable for starting and stopping the switching of the controlled switches. More specifically, the first output port is further operable to supply a power control signal of variable duty cycle which controls the power of the magnetron by causing the control circuit to operate the inverter for variable ON time intervals interspersed with variable OFF time intervals.

The system further has a filament sensor for sensing the current of a filament of the magnetron and the microprocessor receives a signal from the filament sensor and is operable to monitor the current of the filament. The filament sensor may be a current sensing resistor in circuit with the primary. Alternatively, a current transformer could be used to sense filament current. The microprocessor is operative in response to the filament sensor input to detect filament heater circuit discontinuities. The filament sensor information may also be used to automatically control the duration of filament heat-up periods.

In another aspect of the present invention, a current sensing resistor is used as a magnetron sensor for generating a signal depending on the magnetron power. The microprocessor is connected to receive the signal from the magnetron sensor and is operable to adjust the frequency of the inverter for changing the magnetron power until the signal from the magnetron sensor is brought to a set point corresponding to a desired magnetron power.

BRIEF DESCRIPTION OF THE DRAWINGS

The above and other features and objects of the present invention will be readily understood when the following detailed description is considered in conjunction with the accompanying drawings wherein like characters represent like parts throughout the several views and in which.

DETAILED DESCRIPTION

Figure 1:
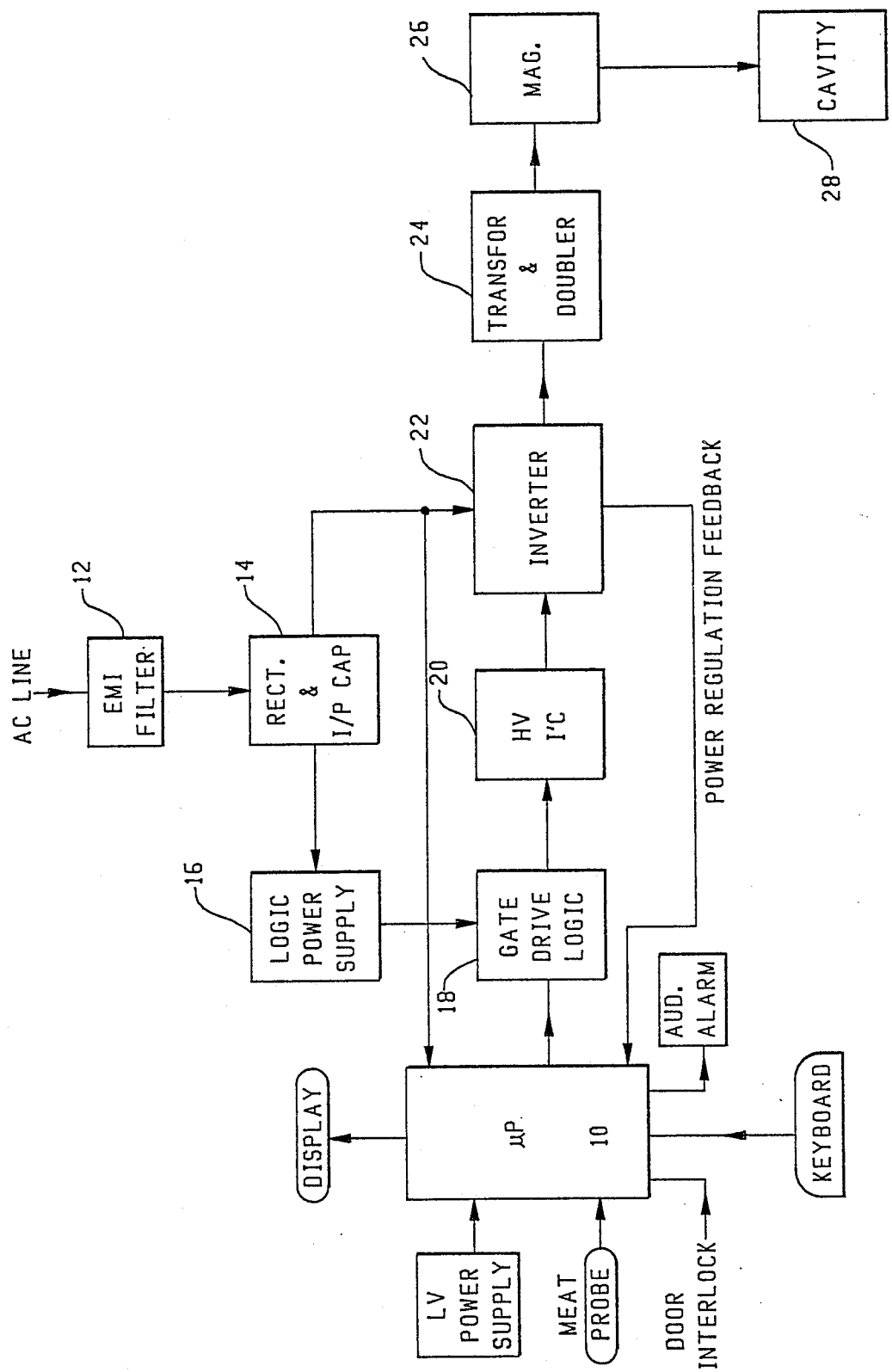
FIG. 1 shows a functional block diagram of a microwave oven control system illustratively embodying the present invention.

FIG. 1 is a functional block diagram of a microprocessor based microwave oven power control incorporating a high frequency inverter circuit for driving the oven magnetron. In this system microprocessor 10 performs a large number of normal functions, which functions correspond to those commonly carried out by microprocessors used in microwave ovens. Additionally, the microprocessor 10 provides a number of functions for an inverter including starting the inverter, stopping the inverter, adjusting the power level of the inverter, establishing the filament in a stand-by mode, changing the frequency of the inverter, and detecting a magnetron fault condition. The present description will concentrate on the inverter control functions since the normal functions are well known.

In the system illustrated in FIG. 1, the AC line is connected to an EMI filter 12 which in turn supplies power to a rectifier and filter capacitor circuit 14. Power from the rectifier/capacitor circuit 14 is supplied to a logic power supply circuit 16, which in turn supplies power to gate drive logic 18. The gate drive logic circuit 18 controls a high voltage isolation circuit 20. A high frequency inverter circuit 22 includes a plurality of controlled switches (switches not shown in FIG. 1) which are operated by the gate drive logic 18 to switchably apply power to a power transformer and voltage doubler circuit 24. As will be discussed in detail below, the inverter 22 actually applies power to a primary (not shown in FIG. 1) of the transformer such that a secondary (not shown in FIG. 1) supplies power to a magnetron 26 by way of a voltage doubler circuit. The magnetron 26 applies microwave energy to a cavity 28. Additionally, the magnetron 26 provides magnetron output power feedback information as shown to the microprocessor 10. As will be discussed in detail below, the power regulation feedback allows the microprocessor 10 to adjust operation of the inverter 22 so as to provide the proper magnetron power.

At this point, it may be useful to note that the microprocessor 10 is used to turn the inverter 22 on and off by way of the gate drive logic 18. Additionally, the microprocessor 10 may monitor the filament power. Further, the microprocessor 10 may stabilize the power of the magnetron 26 at a desired level by adjusting the operation of the inverter 22. More specifically, the microprocessor 10 may cause the inverter 22 to operate in variable ON time intervals interspersed with variable OFF time intervals. By changing the duty cycle or relationship between the length of the ON time intervals compared with the OFF time intervals, the power of the magnetron 26 may be controlled. Alternately, the microprocessor 10 may vary the power of magnetron 26 for power control and/or regulation by adjusting the switching frequency of the inverter 22.

In the illustrated embodiment herein described, microprocessor 10 is a Hitachi type HMCS 43 or HMCS 4A microcomputer. It will be appreciated that other low cost 4 bit microcomputers could be similarly employed. These Hitachi microcomputers are preferred as they are presently used for conventional microprocessor based microwave oven controls and provide the normal control functions in a well known manner.

Figure 2:
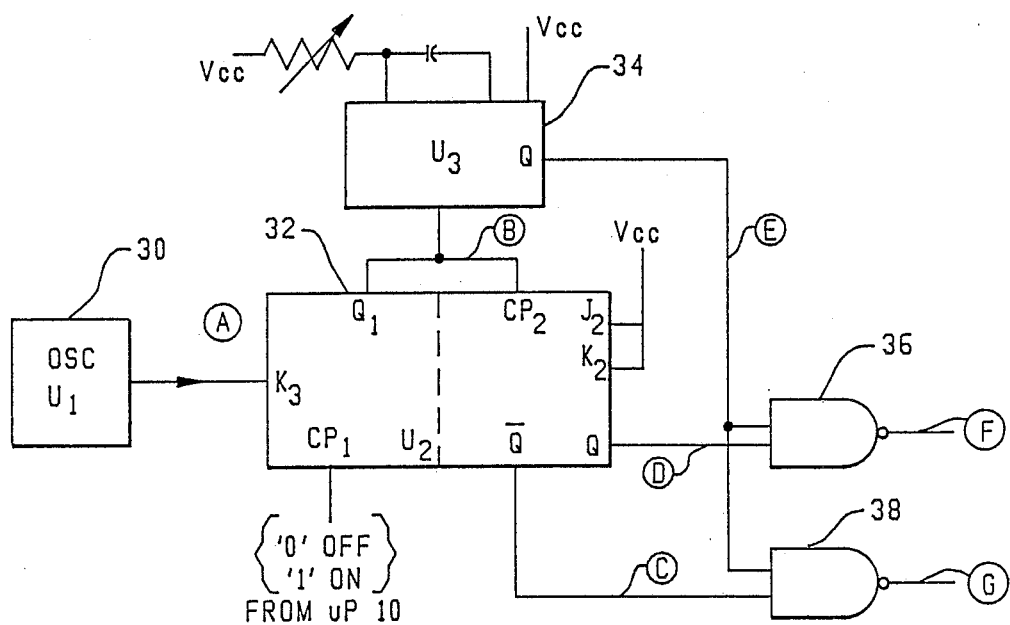
FIG. 2 shows a control circuit which may be used with the control system of FIG. 1.
Figure 3:
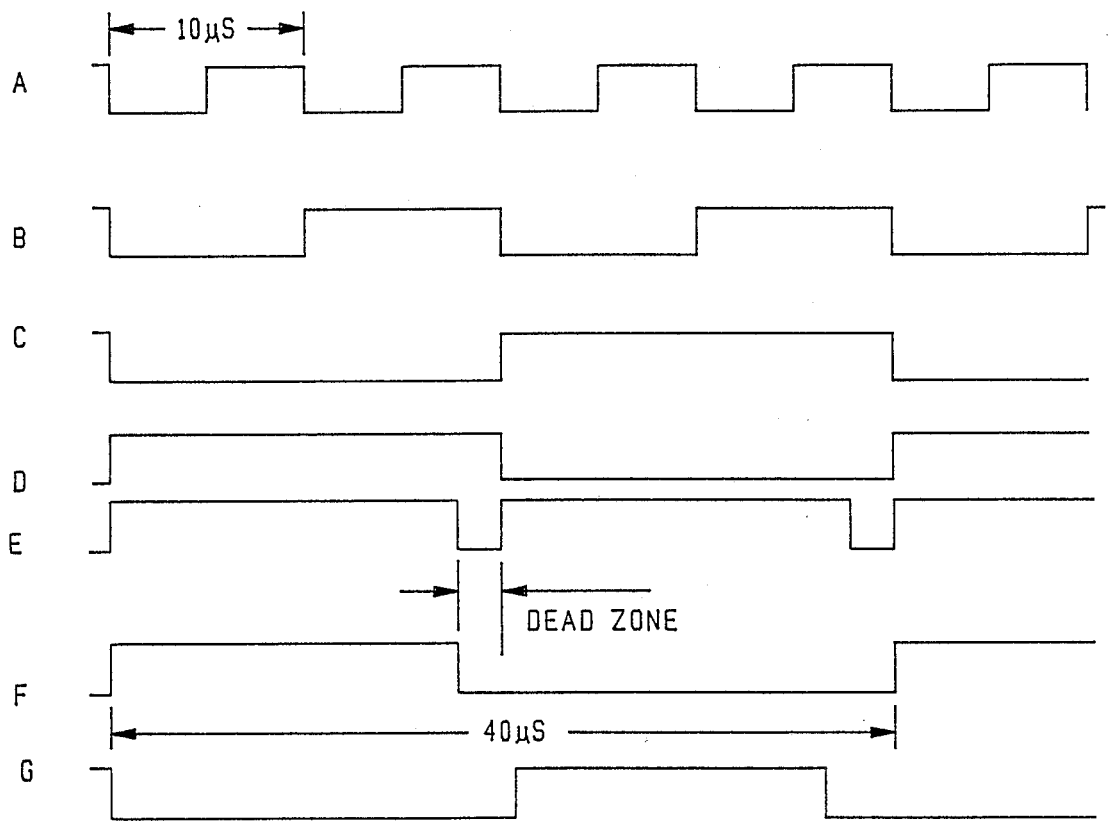
FIG. 3 shows a timing chart illustrating wave forms of various portions of the circuit of FIG. 2.

FIG. 2 shows additional details of a gate drive logic circuit for enabling the microprocessor 10 to control the magnetron power by duty cycle control. The circuit of FIG. 2 includes an oscillator 30 which operates at a constant frequency. The oscillator may produce a square-wave output with fast rise and fall times. A divider or counter 32 receives the oscillator output at line A. Line B connects the counter 32 to a retriggerable one shot multivibrator 34 which is used to establish a dead zone. Viewing also FIG. 3, the oscillator output at line A illustrated in FIG. 3 as waveform A is divided and supplied to the one shot 34 in the form shown as waveform B in FIG. 3. The output of counter 32 at line C is a series of waveforms of lower frequency than the oscillator 30 (waveform C in FIG. 4). A complementary output to that provided on line C is supplied on line D (waveform D in FIG. 4) for application to gate 36. By using the signal on line E from one shot 34 to gate the outputs of the counter 32 in gate 36 and similar gate 38, gating pulses such as shown at waveforms F and G are produced. The gating pulses at line G would be complementary to those at line F except that both lines F and G would be low during the dead zone established by line E from the output of one shot 34. The dead zone is used to insure that one pair of controlled switches in the inverter are completely switched off before another pair of control switches (not shown in FIG. 2) are switched on.

Figure 4:
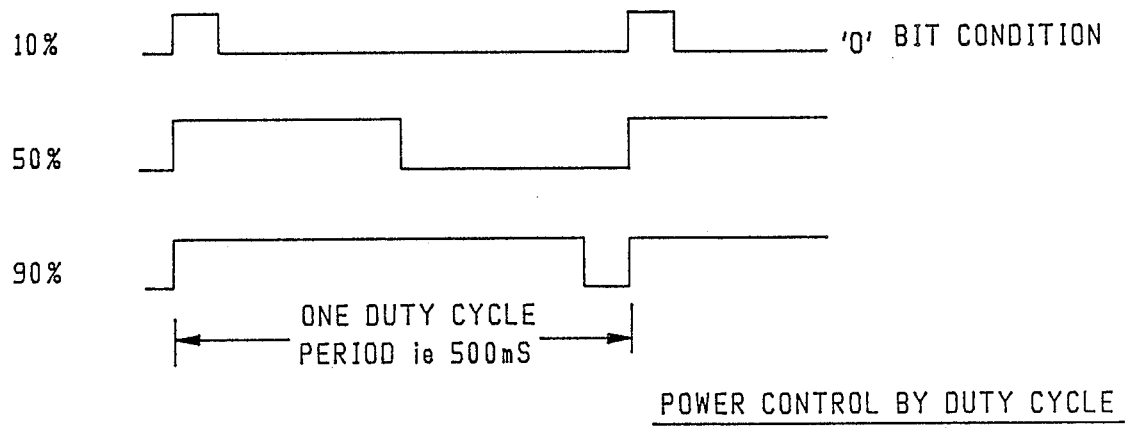
FIG. 4 shows a timing chart illustrating one arrangement for implementing duty cycle power control in the system of FIG. 1.

Continuing to consider FIG. 2, but also considering the timing diagram of FIG. 4, the use of microprocessor 10 to control the power of the inverter by varying the ON time intervals of the inverter will be discussed. As shown in FIG. 2, the CP1 input to the counter 32 is controlled by the microprocessor 10. In particular, the counter 32 will halt the supply of gating pulses at lines F and G if the microprocessor supplies a 0 to CP1. On the other hand, the microprocessor may supply a 1 to the CP1 input such that the gating pulses will occur on lines F and G. By varying the duty ratio of the power control signal supplied to the CP1 input of the counter 32, one can control the operation of the inverter. For example, for the 10% power level shown at the top of FIG. 4, the duty cycle of the signal supplied by the microprocessor to the CP1 input of the counter 32 would have a 10% duty cycle. In similar fashion, the microprocessor would provide a 50% duty cycle signal (second line of FIG. 4) if the inverter was to be operated at a 50% power level. Likewise, the lower line of FIG. 4 shows a 90% duty cycle which would correspond to 90% power level for the magnetron. Considering that a period of, for example 500 milliseconds, could be used, the actual gating pulses produced at lines F and G of FIG. 2 would occur in clusters corresponding to an ON time interval interspersed between OFF time intervals corresponding to a low level of the signal supplied to CP1. It should be noted that the duty cycle of the actual gating pulses does not change (i.e., is independent of the power control signal). Instead, this arrangement turns on and off the flow of gating pulses to vary the power of the magnetron. As will be discussed below, the gating pulses output by gates 36 and 38 are used to gate controlled switches in the inverter.

The microprocessor may easily change the output it provides to the CP1 input of counter 32 by operator selection. For example, the consumer may select different power levels in 10% increments between 10% and 100% and the microprocessor may simply generate a power control signal as shown in FIG. 4 such that the duty cycle of the power control signal controls the power of the magnetron. Note that because the gating pulses on lines F and G of FIG. 2 are preferably produced at between 20 KHz and 30 KHz, the microcomputer time constraints would make it difficult or impossible to control the duty cycle of the gating pulses themselves directly for the same reason that the microcomputer timing relationships preclude the generation of gating pulses directly by the microcomputer.

Figure 5:
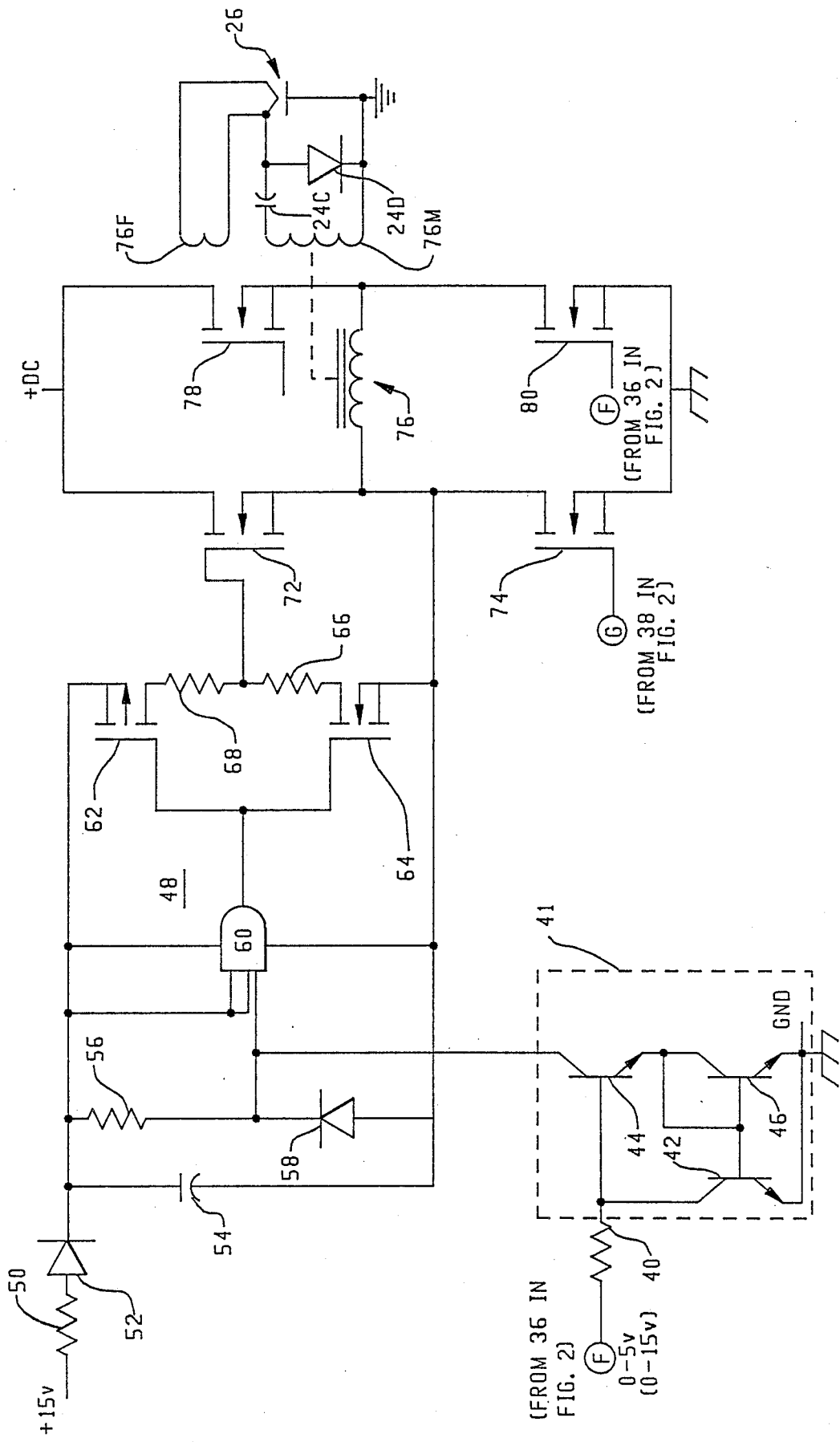
FIG. 5 shows circuit details of a drive circuit and inverter circuit for the system of FIG. 1.

With reference now to FIG. 5, the details of the high voltage isolation circuit and the inverter will be discussed. The inverter is a full wave full bridge inverter comprising power switching, MOSFET switches 72, 74, 78, and 80. Switches 74 and 80 are controlled directly by applying output signals from lines F and G from oscillator 32 (FIG. 2) to the gate terminals of switches 74 and 80 respectively. Signals at F and G are applied to switches 72 and 78 respectively by flying capacitor isolation drive circuits 48 in lieu of a more conventional pulse transformer isolation circuit, the latter being considered less efficient and more costly.

Only one isolation drive circuit 48 is shown in FIG. 5. It will be appreciated that in practice an additional drive circuit would be provided to couple line G (FIG. 2) to the gate switch 78.

The flying capacitor drive circuit 48 is based upon the fact that power FETs like MOSFETs 72, 74, 78, and 80 are voltage driven and draw negligible gate current in the ON state. Accordingly, the drive circuit 48 uses capacitor 54 to store the drive voltage. The capacitor 54 floats on the source potential of the source of MOSFET switch 72 and the drain of MOSFET switch 74.

When a gate pulse appears on line G from oscillator 32, and in the absence of a gate pulse on line F, the transistors 74 and 78 are closed, and transistors 72 and 80 are open. The line at the low side of capacitor 54 is about 2 volts positive (from the resistance of the transistor 74 when it is turned on). This forward biases diode 52 allowing the capacitor 54 to charge up to about 13 volts. The circuit across the capacitor 54 comprising resistor 56 and diode 58 allows almost no drain when it is in the quiescent or off mode. When the transistors 74 and 78 are opened and, before the closing of the transistors 72 and 80 (recall the dead zone), the firing circuit tied to the capacitor 54 is floating. A pulse from oscillator 32 applied to line F activates current sink 41, comprising transistors 42, 44, and 46 via resistor 40, causing current to flow through the resistor 56, dropping the voltage at the junction of resistor 56 and diode 58. This switches the output of gate 60 low which turns on the switch 62 and turns off the switch 64. Resistors 66 and 68 are disposed between the transistor 62 and 64 to provide a signal to the gate of transistor 72 to enable rapid turn on and turn off of switch 72.

Upon cessation of the pulse at output F from oscillator 32, the current sink 41 becomes non-conductive, causing the voltage at the junction of resistor 56 and diode 58 to pull up, switching the output of gate 60 high. When the output of gate 60 goes high, switch 62 is turned off and switch 64 is turned on, rapidly switching transistor 72 off.

As also shown in FIG. 5, the primary 76 is connected to a magnetron powering secondary 76M and a filament winding 76F which provide power to the magnetron 26. The secondary 76M is connected to the magnetron 26 by way of a voltage doubling circuit having capacitor 24C and diode 24D.

Filament Sensing

In order to avoid the well known moding problems associated with operating a magnetron with a cold filament, provision is made for operating the magnetron in a filament standby mode to permit preheating of the filament. It will be appreciated that even with provisions for preheating, an open circuit failure in the filament heater circuit would prevent heating of the filament resulting in operation of the magnetron with a cold filament. To avoid damage to the magnetron from such operation, provision is also made for monitoring the filament condition during standby operation to detect the occurrence of a discontinuity in the filament heater circuit and prevent operation of the magnetron upon detection of such a condition.

Figure 6:
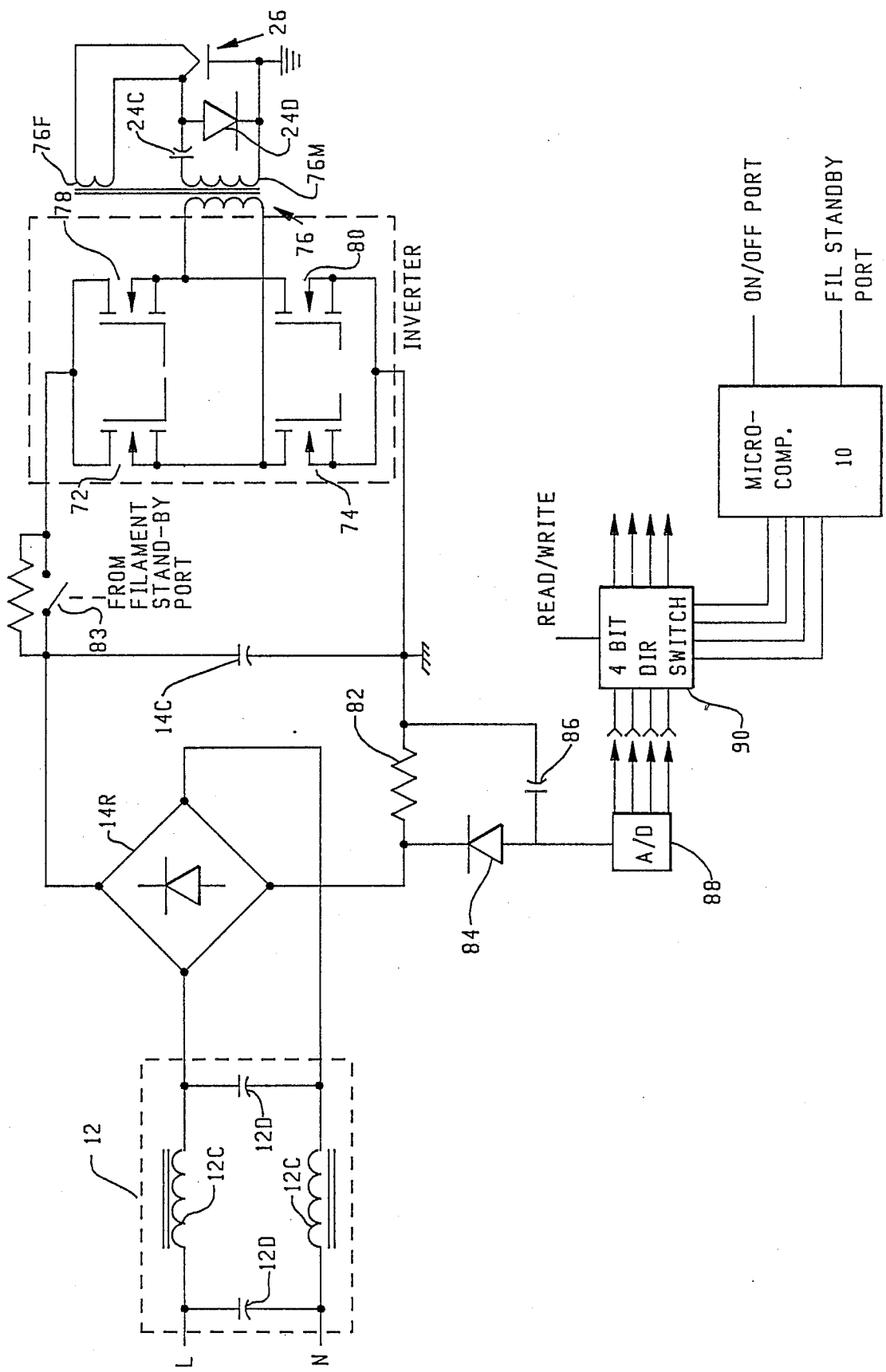
FIG. 6 shows circuit details of the system of FIG. 1 illustrating filament monitoring circuitry and circuitry for implementing standby operation.

FIG. 6 illustrates means employed in the illustrative embodiment for providing the standby operating mode and for monitoring the filament condition in accordance with the present invention.

As shown in FIG. 6, the EMI filter 12 comprising inductive choke 12C and a filter capacitor 12D is connected to a bridge rectifier 14R and a filtering capacitor 14C such that bulk DC may be supplied to inverter 22. The gate drive circuitry for the inverter, which would be configured and connected as in FIG. 5, is not shown in FIG. 6 for ease of illustration.

In the circuit arrangement of FIG. 6, resistor 81 and filament standby control switch 82 cooperate to provide the filament standby function. For normal steady state operation, the filament standby switch is closed shunting resistor 81. However, when starting up, before initially turning on the inverter 22, the microprocessor 10 will operate in a filament standby mode by generating a filament standby signal at a dedicated port referred to herein as its filament standby port which is operative to open controlled switch 83. The opening of the controlled switch 83, which may be realized with an FET or other semiconductor switch, switches the resistor 81 in series circuit between the bridge rectifier 14R and the inverter 22. The resistor 81 is a power resistor serving to drop the voltage applied to the inverter 22. By selecting resistor 81 to drop a sufficient amount of voltage, the inverter 22 will operate at a sufficiently low voltage that the magnetron 26 will be below its Hartree point. In other words, inverter 22 is operating at a sufficiently low voltage that the voltage applied to the magnetron is insufficient to drive the magnetron into conduction. However, resistor 81 is selected such that the lowered voltage applied to the primary 76 will provide sufficient power to filament secondary 76F to warm up the filament of magnetron 26.

Means for monitoring the filament condition is provided by a current sensing resistor 82. Resistor 82 develops a voltage across it which representative of the bulk DC return current from inverter circuit 22.

It has been experimentally determined that the bulk DC current flowing into or out of the inverter circuit is proportional to the power transferred to the magnetron. Since magnetron output power is negligible when the magnetron is operating below the "Hartree" voltage, as it is in the standby mode, substantially all of the power transferred to the magnetron goes to the filament. Thus, when operating in the standby mode, the bulk return current is proportional to filament power. In accordance with the present invention, the microprocessor is arranged to monitor the bulk return current when operating into standby mode, to detect a discontinuity in the filament heating circuit. Information derived from monitoring the bulk return current may also be used, as hereinafter described, by the microprocessor to automatically terminate the preheat or standby mode when the bulk return current indicates that the filament is sufficiently hot for proper magnetron operation.

Assuming that the filament standby switch 83 is open as shown in FIG. 6, the inverter will be operating at a lower voltage level such that the magnetron itself will be below its Hartree point and, essentially, non-conducting (i.e., off). Accordingly, the voltage sensed across resistor 82 corresponds to the power of the filament of the magnetron 26.

In the illustrative embodiment, resistor 82 is a non-inductive 0.1 ohm resistor. Under normal operating conditions the filament is operated at approximately 3 volts and draws approximately 15 amps. For the filament load only, as is the case in the standby mode, corresponding bulk return current reaches approximately 6.5 amps. Thus, a peak voltage across resistor 82 is on the order of 0.65 volts. This peak is detected by diode 84 and stored in capacitor 86 for reading by high input impedance analog and digital converter circuit 88. When the inverter operates at full power the peak voltage across resistor 82 is only about 2 volts. Thus, there is no need to protect the A to D circuit against overvoltage.

Since the ports on microprocessor 10 are bi-directional, that is the ports can be either input or output ports, a four-bit bi-directional switch 90 is used to isolate the input and output data lines.

The A/D converter converts the analog voltage signal to digital form and provides a four bit digital signal to a four bit bi-directional switch 90. The bi-directional switch 90 is controlled by a read/write line as illustrated and allows four bits of data to be written into the microprocessor 10 when in the write mode and allows four bits of data from the microprocessor 10 to be read when in the read mode. The four outputs at the right of bi-directional switch 90 in FIG. 6 are not shown connected to anything but an embodiment discussed below will indicate how such data from the microprocessor 10 could be used.

Figure 7A:
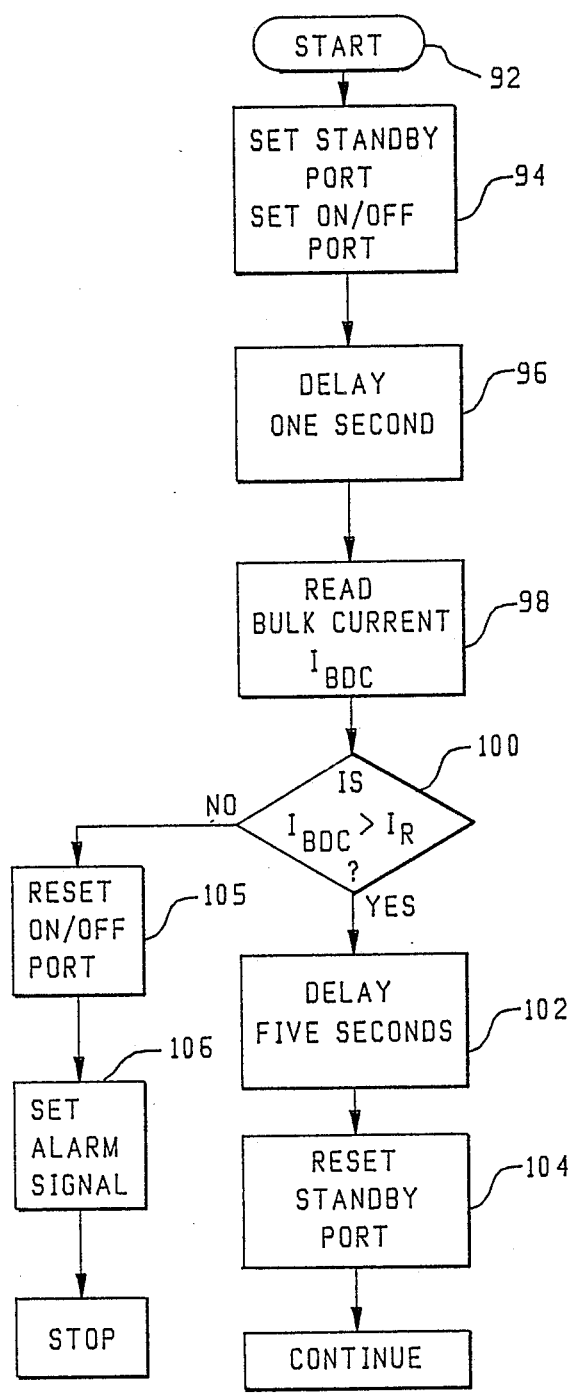
FIG. 7A shows a flow chart for incorporation in a microprocessor for use in conjunction with the filament current sensing arrangement of FIG. 6.

FIG. 7A is a simplified flow chart illustrating how the standby mode is controlled, filament conduction is monitored by the microprocessor 10. In particular, the control trnsfers from start block 92 to block 94 which sets the ON/OFF port (FIG. 6) to enable the inverter circuit and sets the filament standby port (FIG. 6) to open the filament standby switch 83. The inverter will therefore be operating at a lower voltage such that the magnetron itself is not yet turned on, but the filament is receiving current to warm it up. After a delay of one second in block 96, the microprocessor reads the filament current input from directional switch 90 at block 98. After reading the current, control is transferred to block 100 which tests for the presence of current by comparing the sensed current $I_{BDC}$ to a predetermined relatively low reference value $I_R$. Assuming current is present, control transfers to 5 second delay block 102 which holds the system in the standby mode for 5 seconds, to permit the filament to heat up. Block 104 resets the standby port to terminate standby operation by shunting resistor 81 (FIG. 6) and continues with normal steady state system operation.

If the block 100 indicates that no current is present, the system has a continuity problem, and, therefore, magnetron operation should be avoided. In that situation, the ON/OFF port is reset to turn OFF the inverter at Block 105 and control is transferred to an alarm 106 which can trigger an audible signal or visual display signal, or both, signifying a magnetron malfunction.

Figure 8:
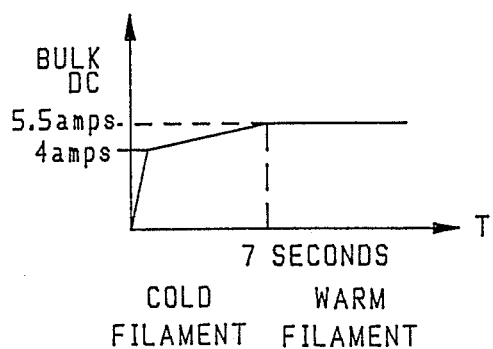
FIG. 8 shows how a voltage representative of filament current changes in the system of FIG. 1 as the filament warms up.

The flow chart of FIG. 7A is relatively simple in that the microprocessor simply checks for the presence of current corresponding to filament power and delays operation of the inverter until the filament current has lasted for a predetermined time. Continuing to view FIG. 7A, but also referencing FIG. 8, an alternate arrangement will be discussed which uses bulk return current information to automatically control the duration of the preheat or standby mode period. FIG. 8 shows how the bulk return current varies over time as the filament warms up in the standby mode. Although one might expect that the filament resistance would increase as it warmed up, the system is not a constant voltage system because of the effects of resonance. Accordingly, the voltage across sensing resistor 82 of FIG. 6 varies in the asymptotic manner shown in FIG. 8.

A shown in FIG. 8, for the magnetron of the illustrative embodiment the bulk DC return current rises rapidly to an effective starting current of approximately 4 amps. The current then gradually asymptotes to a maximum of about 5.5 amps over a period of approximately 7 seconds. The ratio of asymptote, that is, steady state current to effective starting current is approximately 1.4. This information can be used by the microprocessor to automatically detect when the filament has reached its steady state temperature. Specifically, the microprocessor can monitor the bulk current to detect the effective starting current and then periodically compute the ratio of sensed current to start current until the ratio exceeds a reference on the order of 1.4 Upon detection of a ratio greater then the reference the microprocessor terminates the standby mode by resetting the standby port.

Figure 7B:
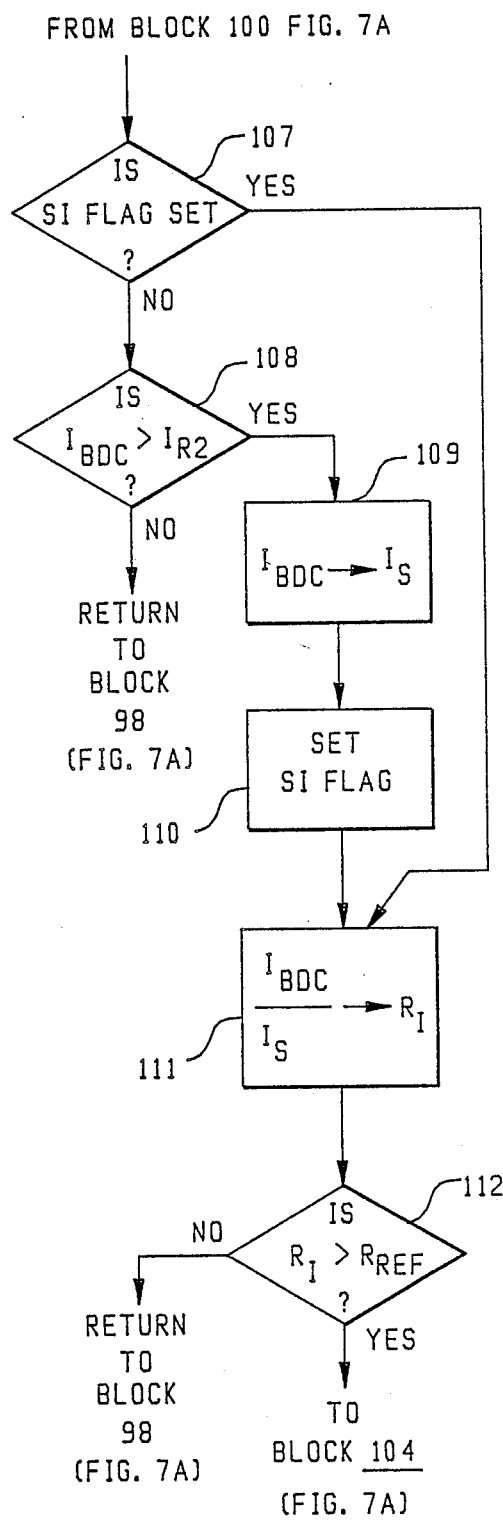
FIG. 7B shows a flow chart modifying to flow chart of 7A.

FIG. 7B represents a flow diagram for illustrating use of bulk return current information to control the duration of the standby mode. Specifically, block 102 of FIG. 7A is replaced by blocks 107–112 shown in FIG. 7B. After determining that no discontinuity exists in the filament at block 100 (FIG. 7A) block 107 determines if the internal program flag designated SI is set. This SI flag is set, as will be hereinafter described, upon first detection of the current exceeding a starting current reference value. Assuming the SI flag is not set, block 108 compares the sensed bulk current $I_{BDC}$ to the starting current reference designated $I_2$ which in the illustrative embodiment is set at 3.5 amps. If the current has not yet exceeded this reference, the program returns to block 98 (FIG. 7A) to read in the next value of current. Once the current first exceeds the starting reference value 3.5 amps, that current value is stored as variable $I_S$ at block 108. The SI flag in then set a block 110 and at block 111 the ratio designated $R_I$ of the sensed current to the stored starting current $I_S$ is computed and at block 112 this computed ratio is compared to a reference ratio which for the illustrative embodiment is set equal to 1.4. If the computed ratio is not greater than the reference, program control returns to block 98 (FIG. 7A) to take the next current reading. Upon first detection of a computed ratio greater than the reference, the standby mode is automatically terminated by resetting the standby port at block 104 (FIG. 7A) and the program continues as previously described.

Frequency Control

Figure 9:
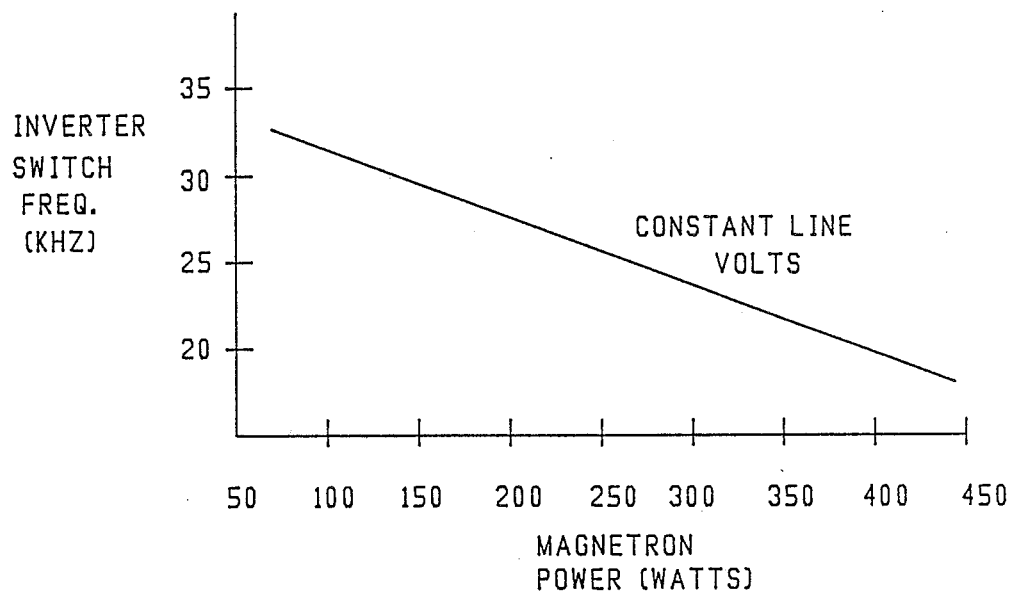
FIG. 9 is a graph illustrating the relationship between inverter switching frequency and magnetron power for a magnetron of the type incorporated in the system of FIG. 1.

FIG. 9 illustrates how the magnetron power varies as a function of the inverter switching frequency for constant line volts. This curve assumes that the secondary of the power transformer is a tuned circuit having a resonant frequency of about 19 KHz. Accordingly, the closer the inverter switching frequency is to the resonant frequency of 19 KHz, the more power is supplied to the magnetron. This principle of operation is explored in more detailed in the incorporated by reference application entitled "COOKING MAGNETRON WITH FREQUENCY CONTROL FOR POWER REGULATION", Ser. No. 138,135.

Figure 10:
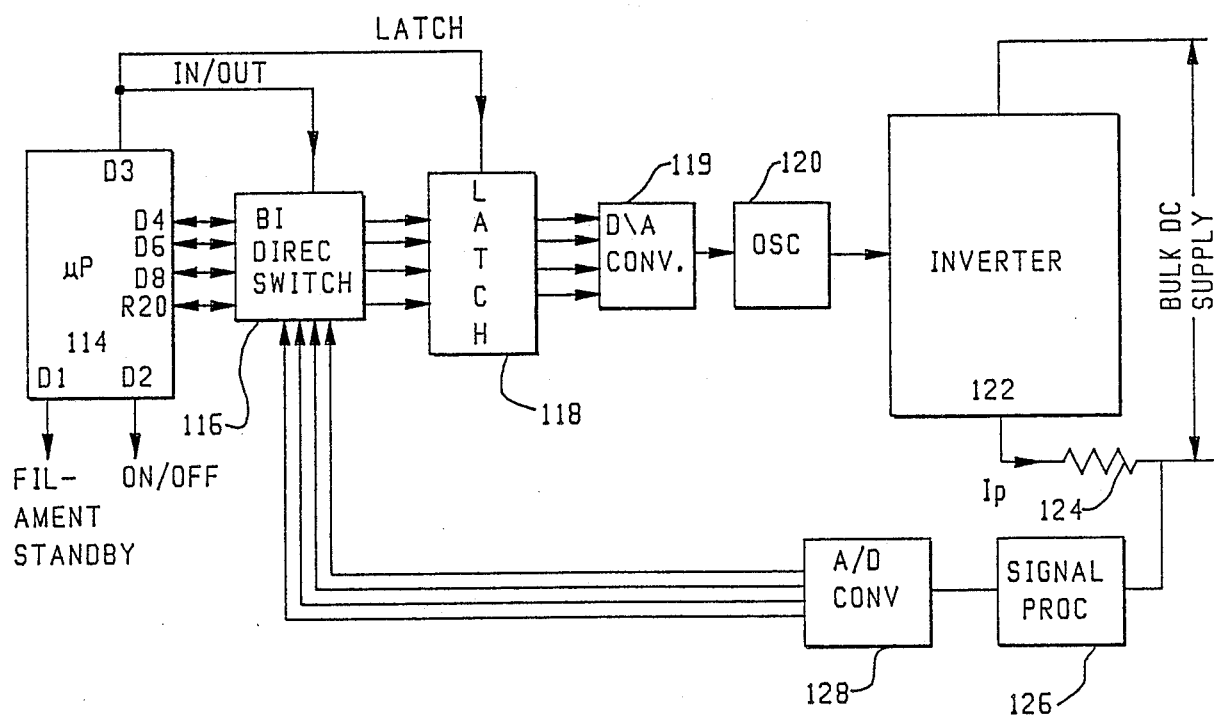
FIG. 10 shows an arrangement for sensing the magnetron power and controlling it applicable to the system of FIG. 1.

With reference now to FIG. 10, a microprocessor arrangement for controlling the power based upon the frequency/power characteristics of FIG. 9 is shown. Because some portions of the arrangement of FIG. 10 are similar to those previously discussed, the discussion which follows will concentrate upon the differences. Inverter details and the power transformer and magnetron are not shown in FIG. 10 as they are illustrated in previous drawings.

A microprocessor 114 is connected to a bi-directional switch 116 which is used for inputing to and outputting data from four ports of the microprocessor. A latch 118 is connected to receive and store data output by the microprocessor 114. The latch 118 is connected to a digital to analog converter 119 which in turn supplies a signal to a control circuit 120 which includes an oscillator. The control circuit 120 is used to control the switching frequency of a full wave full bridge inverter 122. A current sensing resistor 124 is in circuit with the inverter 122. The resistor 124 may be in a similar position in the circuit as the resistor 82 of FIG. 6. The current sensing resistor 124 senses the current in the primary (not shown in FIG. 10). Just as resistor 82 of FIG. 6 indicates the power used by the magnetron filament, when operating in the standby mode, the resistor 124 will indicate the power used by the magnetron itself when in the steady state normal operation mode. Under such circumstances, the resistor 124 serves as a magnetron sensor to sense the power to the magnetron. A signal processing circuit 126 acts on the signal provided by the resistor 124. The signal processing circuit preferably comprises a peak voltage detector similar to that formed by diode 84 and capacitor 86 of FIG. 6, although other circuits could be used. The output of signal processor 126 is supplied to an A/D converter 128, the output of which is representative of the power applied to the magnetron. The output of A/D converter 128 is supplied to the bi-directional switch 116 for entry into the microprocessor 114.

Figure 11:
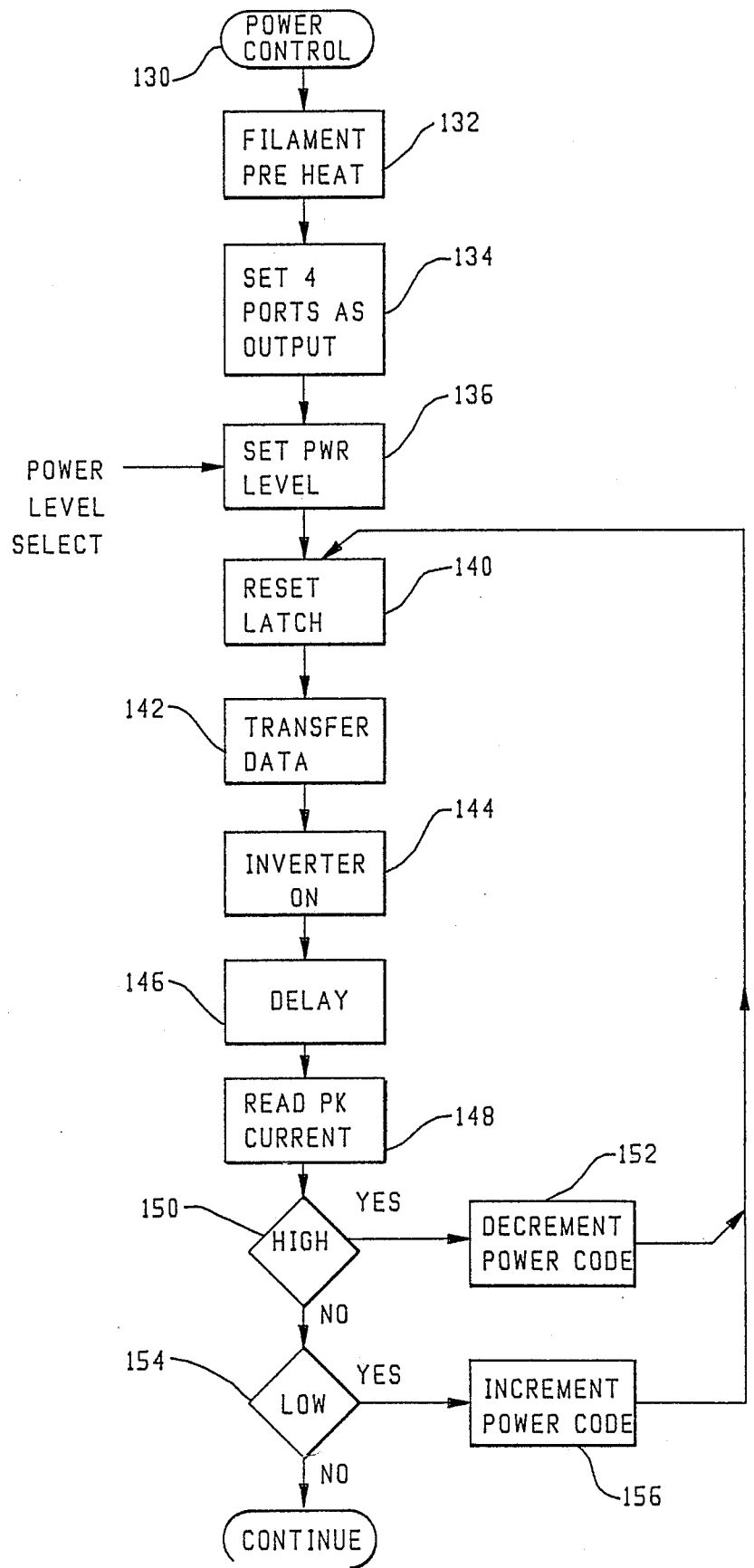
FIG. 11 shows a flow chart for incorporation in the microprocessor of FIG. 1 to control magnetron power by changing inverter frequency.

Referring to the flow chart of FIG. 11 in conjunction with FIG. 10, the operation of the arrangement of FIG. 10 will be discussed. Upon entry to this subroutine at power control block 130, the filament is preheated at block 132. Preheating of the filament of the magnetron may be accomplished as hereinbefore described with reference to FIGS. 6 and 7 by a switch (not shown) similar to the switch 83 of FIG. 6 such that the inverter 122 would be operating at a relatively low voltage. At block 134, the microprocessor 114 would set the four data ports for outputting data. Block 136 corresponds to establishing the power level set point depending upon the user's prior selection. For a particular embodiment of the present system, the power level range may include the following binary numbers corresponding to the desired percentage of power which the consume had entered:

| Percentage Power | Binary Number |
|---|---|
| 10% | 0001 |
| 20% | 0010 |
| 30% | 0011 |
| 40% | 0100 |
| 50% | 0101 |
| 60% | 0110 |
| 70% | 0111 |
| 80% | 1000 |
| 90% | 1001 |
| 100% | 1010 |

For example, assume that the user selected the 50% power level. This power set point represented by Binary Code 0101 would be stored in the microprocessor as the desired power level by operation of block 136. Block 140 resets the latch 118 (FIG. 10) to prepare it for receipt of new inputs for microprocessor 114. Block 142 transfers data from the computer 114 to the latch 118 by switching bi-directional switch 116 to proper state for outputting data. The data transferred represents the power level set point of 0101 for the 50% example. At block 144, the inverter 122 is turned on for full operation, such as by closing a filament standby switch similar to switch 83 of FIG. 7 so that the inverter 122 is operating with sufficient power to cause the magnetron to generate microwave power. The power set point supplied at latch 118 is converted into an analog signal by converter 119 which is supplied to a control circuit 120 which includes an oscillator which establishes a switching frequency for inverter 122 according to the signal supplied by latch 118 and converted by converter 119. Referring back to FIG. 9 and assuming that 450 watts would be the full magnetron power, it will be appreciated that the inverter switching frequency should be approximately 26 KHz in order to lower the magnetron power to 225 watts. The actual mechanism for changing the oscillator frequency may use a current mirror connected to the timing resistor 10 of a drive generator chip such as the SG3526J, a pulse width modulator integrated circuit made by Silicon General. The mechanics of how a signal (i.e., from converter 119) may be used to change an oscillator frequency of such a chip are not part of the present invention, but are disclosed in the incorporated by reference application entitled "MAGNETRON WITH FREQUENCY CONTROL FOR POWER REGULATION", Ser. No. 138,135.

Referring again to FIG. 11, block 144, the inverter will be operating at full voltage at a frequency dependent upon the power level set point selected by the user. Regulation of output power to compensate for line voltage fluctuations uses bulk DC return current information derived from sense resistor 124. Following a delay at block 146, the block 148 reads the peak current by reading the voltage of magnetron sensor resistor 124. Assuming that line voltage fluctuations have caused the peak current to be higher than the value which corresponds to 50% power operation, the peak current might have a value represented digitally as 0110 which corresponds to 60% power level. Block 150 tests to determine if the actual magnetron power as represented by the bulk return current is higher than the selected power level. If it is, control transfers to block 152 which produces a modified power level binary number of 0100 derived from decrementing the set point to the next lower level which in the example is a change from 50% to 40%. Control transfers from block 152 to block 140 which resets the latch and transfers the data at block 142. In this case, the data transferred at block 142 to the latch 118 is the binary number 0100 corresponding to the modified power level. This change in the value in latch 118 causes the frequency of the inverter 122 to move higher, thereby lowering the magnetron power (as per curve of FIG. 9). Following the inverter ON block 144, delay block 146, and read peak current block 148, the block 150 would now test the actual peak current against the original set point of 0101. Assuming that the frequency change was sufficient, the block 150 would find that the change in frequency has brought the peak current or magnetron power into conformance with the desired power.

Block 160 leads to block 154 which tests to determine if the actual magnetron power is below the desired level. If so, a modified power level is generated by block 156 incrementing the power level. If block 154 indicates that the actual power level conforms to the desired power level, control is transferred to Continue block 155 which enables the control program to continue with other control algorithms. It will be appreciated that the control program for microprocessor 114 will cyclically execute the subroutine in FIG. 11 along with other control algorithms such as an algorithm to control operating times.

Feedback Loop With Shutdown

Figure 12:
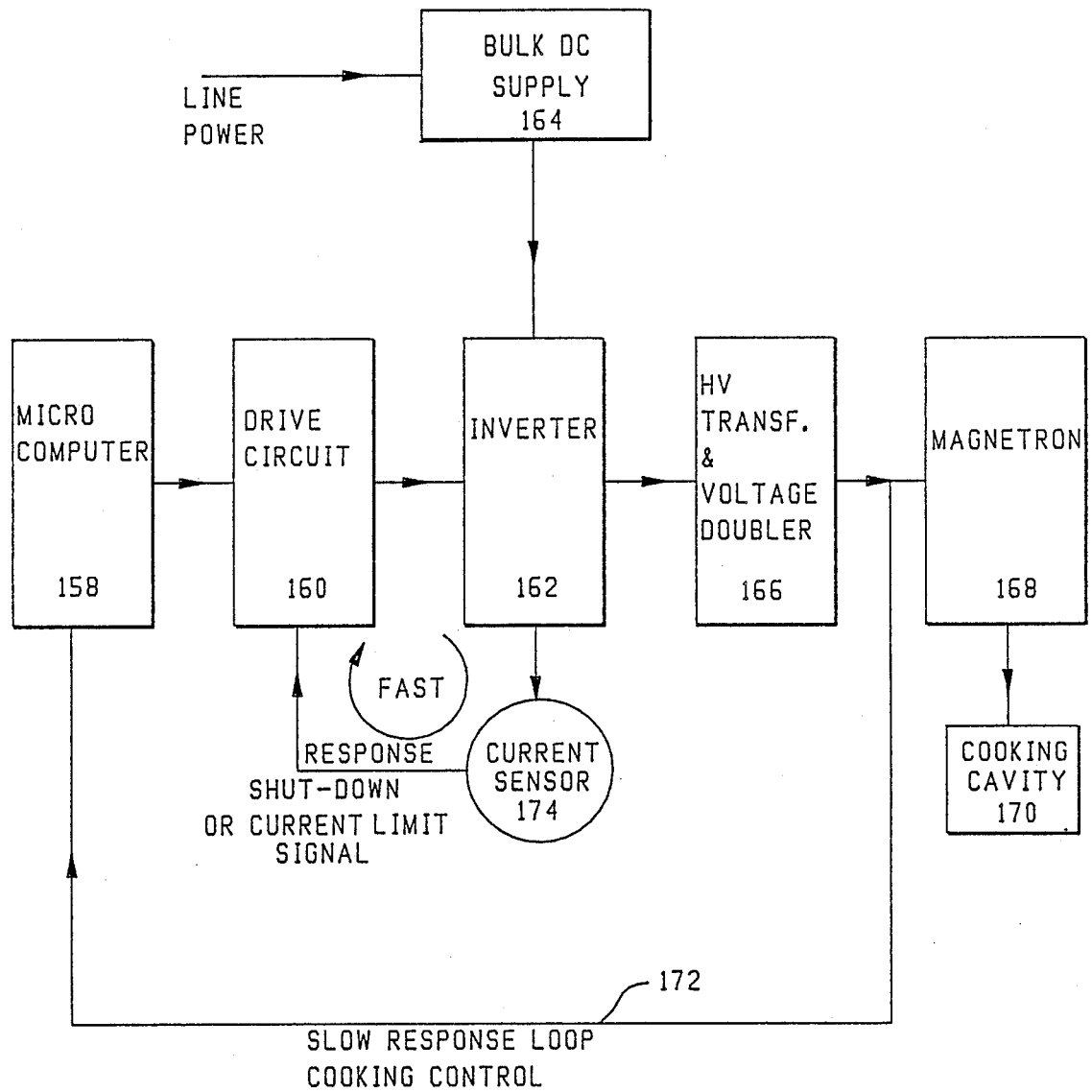
FIG. 12 shows a functional block diagram of a microwave oven power control arrangement using two feedback control loops.
Figure 13:
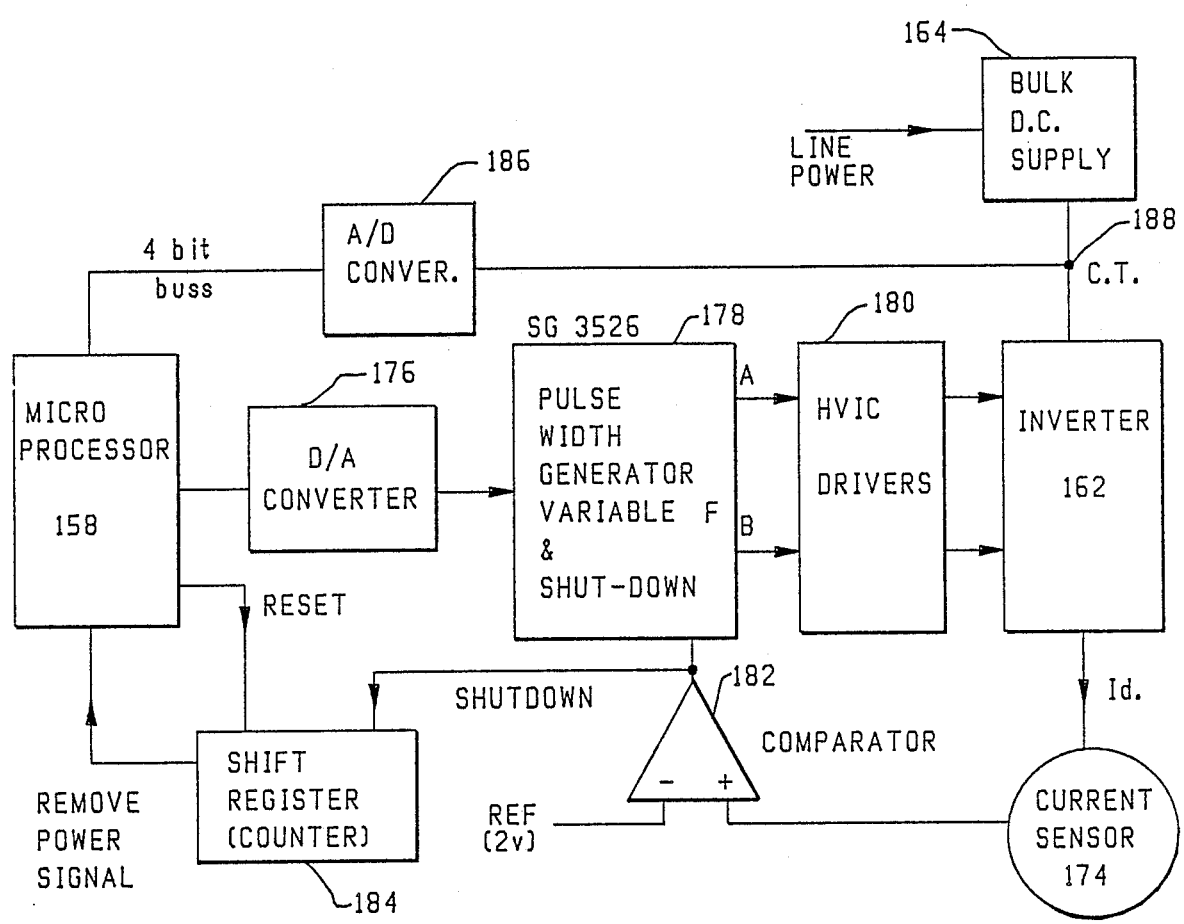
FIG. 13 shows details of a portion of a feedback control arrangement of the type functionally illustrated in FIG. 12.

With reference now to FIGS. 12 and 13, an arrangement for providing two feedback loops will be discussed. FIG. 12 includes a microprocessor 158 connected to drive circuit 160 which drives a full wave full bridge inverter 162. The inverter 162 is supplied power from a bulk DC supply 164. The inverter controls power flow to a high voltage transformer and voltage doubler 166 which in turn powers magnetron 168 for cooking within a cooking cavity 170. As the details of these blocks are identical or quite similar to the components discussed in detail above, the emphasis and the discussion which follows will be on features of the FIG. 12 arrangement which are different from that discussed above.

The slow response feedback loop for cooking control 172 is a simplified schematic illustrating the control loop through the microprocessor 158, which control loop may correspond to the frequency changing power stabilization technique illustrated in more detail in FIG. 10. Alternatively, the slow loop might use the duty cycle control discussed in conjunction with FIG. 4 and modified to change the ON time intervals depending on feedback from a magnetron power sensor.

A second feedback loop includes current sensor 174 and is designed to shut down inverter operation if the current sensor 174 detects current which is too high. It should be appreciated that the slow response loop 172 has insufficient speed to respond quickly enough to protect the switching transistors and other circuit components from damage by excessive current flow. The switching transistors (not shown in FIG. 13) would of course be the four transistors used within the full wave full bridge inverter 162 which would be configured like the inverters discussed in detail above.

FIG. 13 shows the details of the feedback loop having current sensor 174. The current sensor 174 may be realized by a current sensing resistor similar to resistor 82 of FIG. 7 or resistor 124 of FIG. 10. The resistor could be disposed between the capacitor and bridge rectifier (not shown in FIG. 13) as illustrated for resistor 82 of FIG. 6. Alternately, the resistor could be disposed in a location corresponding to the lower path between the inverter 22 and capacitor 14C in FIG. 6.

A D/A converter 176 receives information from the microprocessor 158 to adjust the frequency from the oscillator portion of chip 178, which may be a Silicon General 3526J chip. The frequency control arrangement may be similar to that discussed above with respect to FIG. 10. The chip 178 is connected to high voltage drivers 180 which control the inverter 162. Accordingly, the frequency of inverter 162 may be adjusted depending upon the power as sensed by a current transformer 188 serving as a magnetron sensor.

The output of the current sensor 174 is supplied to a comparator 182 which compares it with a 2 volt reference signal. If the comparator 182 detects that the output of current sensor reaches 2 volts (it should normally be 1.5 volts for full power operation), the comparator 182 will generate a shutdown signal at its output which will shutdown operation of the chip 178. The details of the chip 178 may be determined by reference to the specification sheet for that chip and are also discussed in more detail in the incorporated by reference application "MAGNETRON WITH FREQUENCY CONTROL FOR POWER REGULATION", Ser. No. 138,135. The comparator 182 will effectively shutdown the inverter operation if the voltage output by current sensor 174 reaches 2 volts. The 2 volts corresponds to a peak current of 40 amps for a particular embodiment of this system and represents the upper limit of operation for IRF640 power FET switches (not shown) used in the inverter 162.

When the comparator 182 switches states to generate a shutdown signal, the chip 178 will stop two successive gating pulses (one for each half cycle) from being generated at outputs A and B. Upon the completion of the two deleted pulses, logic resets the internal memory such that normal gate pulses are restored. If the fault is still present, the circuit will "hiccup" (turn inverter on and off) until the current surge through the transistor switches disappears.

If desired, a shift register 184 may be used as a counter such that ten successive "hiccups" may cause the microprocessor 158 to stop operation of the circuit by switching off power to the oven.

Excessive switching current could be caused by line voltage surges, magnetron moding, magnetron internal arching, internal lapping of gate drive pulses, or transformer voltage breakdown. The feedback loop using current sensor 174 and comparator 182 provides a very fast arrangement for protecting switching transistors and other circuit components from damage or failure which might otherwise result from such conditions. At the same time, a slow feedback loop in FIG. 13 with A/D converter 186 and magnetron power sensing current transformer 188 may provide feedback control for stabilizing magnetron power in the manner of the FIG. 11 arrangement.

Although various specific embodiments have been disclosed herein, it is to be understood that these are for illustrative purposes only. Various modifications and adaptations will be apparent to those of skill in the art. Accordingly, the scope of the present invention should be determined by reference to the claims appended hereto.

What is claimed is:

1. A microwave energy generating system comprising:
   a magnetron operable to generate microwave energy for cooking;
   a power transformer having a primary and a magnetron powering secondary;
   a full wave full bridge inverter connected to supply power to said primary by selectively switching pairs of four controlled switches;
   a control circuit for controlling the operation of said inverter, said control circuit having an oscillator and operable to generate gating pulses to switch said four controlled switches; and
   a microprocessor having a first output port, said first output port connected to said control circuit and operable for starting and stopping the switching of said four controlled switches, and wherein said first output port is operable to supply a power control signal of variable duty cycle and said control circuit further including means responsive to said power control signal and said oscillator to provide gating signals to said controlled switches as a function of the state of said power control signal whereby the duty cycle of the power control signal controls the power of said magnetron.

2. The microwave energy generating system of claim 1 wherein said gating pulses have a duty cycle independent of the power control signal.

3. The microwave energy generating system of claim 1 wherein the duty cycle of said power control signal controls the power of said magnetron by causing said control circuit to operate said inverter for variable ON time intervvals interspersed with variable OFF time intervals.

4. The microwave energy generating system of claim 1 further comprising a filament sensor for sensing a condition of a filament of the magnetron and, wherein said microprocessor is connected to receive a signal from said filament sensor and is operable to monitor said condition of said filament.

5. The microwave energy generating system of claim 1 further comprising a magnetron sensor for generating a signal depending on the magnetron power, and wherein said microprocessor is connected to receive the signal from the magnetron sensor and is operable to adjust the inverter frequency for changing the magnetron power until the signal from said magnetron sensor is brought to a set point corresponding to a desired magnetron power.

6. A microwave energy generating system comprising:
   a magnetron operable to generate microwave energy for cooking;
   a power transformer having a primary and a magnetron powering secondary;
   an inverter connected to supply power to said primary by selectively switching controlled switches; and
   a control circuit for controlling the operation of said inverter, said control circuit having an oscillator and operable to generate gating pulses to switch said controlled switches; and
   a microprocessor having a first output port operable to supply a power control signal of variable duty cycle to control circuit; and
   wherein the duty cycle of said power control signal controls the power of said magnetron, and wherein said control circuit includes a logic circuit connecting said oscillator to have controlled switches, said first output port being connected to supply the power control signal as a logic signal to said logic circuit, said logic circuit selectively providing said gating signals to said controlled switches as a function of the state of said power control signal.

7. The microwave energy generating system of claim 6 wherein said gating pulses have a duty cycle independent of the power control signal.

8. The microwave energy generating system of claim 6 wherein an ON time interval corresponds in duration to said power control signal having a first level and said OFF time interval corresponds in duration to said power control signal having a second level.

9. The microwave energy generating system of claim 6, wherein the duty cycle of said power control signal controls the power of said magnetron by causing said control circuit to operate said inverter for variable ON time intervals interspersed with variable OFF time intervals, each ON time interval corresponding to a cluster of said gating pulses.

10. The microwave energy generating system of claim 9 wherein said inverter is a full wave full bridge inverter having four of said controlled switches.

11. The microwave energy generating system of claim 9 further comprising a filament sensor for sensing a condition of a filament of the magnetron and, wherein said microprocessor is connected to receive a signal from said filament sensor and is operable to monitor said condition of said filament.

12. A microwave energy generating system comprising:
   a magnetron operable to generate microwave energy for cooking;
   a power transformer having a primary and a magnetron powering secondary;
   an inverter connected to supply power to said primary by selectively switching controlled switches; and
   a control circuit for controlling the operation of said inverter, said control circuit having an oscillator and operable to generate gating pulses to switch said controlled switches; and
   a filament sensor for sensing a condition of a filament of said magnetron; and
   a microprocessor connected to receive a signal from said filament sensor and operable to monitor said condition of said filament, and wherein said power transformer further includes a filament powering secondary, and wherein said microprocessor causes said system to operate in a filament standby mode upon start up with the magnetron being off and said inverter operating to supply warm up power to said filament by way of said filament powering secondary.

13. The microwave energy generating system of claim 12 further comprising:
   a filament standby control switch, said filament standby control switch operable in said filament standby mode to lower the voltage to said primary.

14. The microwave energy generating system of claim 13 further comprising a resistor in parallel to said filament standby control switch and operable to lower the voltage supplied to said inverter when said filament standby switch is open.

15. The microwave energy generating system of claim 12 wherein said condition is the current in said filament.

16. The microwave energy generating system of claim 15 wherein the filament sensor senses the filament current indirectly by sensing the current in said primary.

17. The microwave energy generating system of claim 16 wherein the filament sensor comprises a resistor sensing current through said primary.

18. The microwave energy generating system of claim 17 further comprising a peak detector to detect a peak voltage across said resistor and an A/D converter receiving said peak voltage and supplying a corresponding digital signal to said microprocessor.

19. The microwave energy generating system of claim 15 wherein said microprocessor is operable to delay the operation of the magnetron until the filament current has warmed up said filament.

20. The microwave energy generating system of claim 19 wherein said microprocessor has a first output port, said first output port connected to said control circuit and operable for starting and stopping the switching of said controlled switches.

21. The microwave energy generating system of claim 20 wherein said first output port is operable to supply a power control signal of variable duty cycle and wherein the duty cycle of said power control signal controls the power of said magnetron.

22. The microwave energy generating system of claim 21 wherein said inverter is a full wave full bridge inverter having four of said controlled switches.

23. A microwave energy generating system comprising:
   a magnetron operable to generate microwave energy for cooking;
   a power transformer having a primary and a magnetron powering secondary;
   an inverter connected to supply power to said primary by selectively switching controlled switches;
   a control circuit for controlling the operation of said inverter, said circuit having an oscillator and operable to generate gating pulses to switch said controlled switches;
   a magnetron sensor for generating a signal depending on the magnetron power; and
   a microprocessor connected to receive the signal from said magnetron sensor and operable to adjust the operation of the inverter for changing the magnetron power until the signal from said magnetron sensor is brought to a set point corresponding to a desired magnetron power, wherein said microprocessor is operable to change the magnetron power by changing the frequency of said inverter.

24. The microwave energy generating system of claim 23 wherein said magnetron sensor senses the magnetron power indirectly by sensing current in said primary.

25. The microwave energy generating system of claim 23 wherein said microprocessor is operable to compare the signal from said magnetron sensor with different set points depending upon an operator selection of desired magnetron power.

26. The microwave energy generating system of claim 23 wherein said inverter is a full wave full bridge inverter having four of said controlled switches.

27. The microwave energy generating system comprising:
   a magnetron operable to generate microwave energy for cooking;
   a power transformer having a primary and a magnetron powering secondary;
   an inverter connected to supply power to said primary by selectively switching controlled switches;
   a control circuit for controlling the operation of said inverter, said control circuit having an oscillator and operable to generate gating pulses to switch said controlled switches;
   a magnetron sensor for generating a signal depending on the magnetron power; and
   a microprocessor connected to receive the signal from said magnetron sensor and operable to adjust the operation of the inverter for changing the magnetron power until the signal from said magnetron sensor is brought to a set point corresponding to a desired magnetron power, and wherein the microprocessor is operable to adjust the operation of the inverter for changing the magnetron power without changing the duty cycle of the gating pulses.

* * * * *